US009947168B2

(12) United States Patent
Bennett et al.

(10) Patent No.: US 9,947,168 B2
(45) Date of Patent: Apr. 17, 2018

(54) MULTIPLE PAY COMBINATION GAMING APPARATUS

(75) Inventors: Nicholas Luke Bennett, Lane Cove (AU); Marijan Jon Kovacic, Lane Cove (AU); Lloyd Gilbert Sefton, Lane Cove (AU)

(73) Assignee: ARISTOCRAT TECHNOLOGIES AUSTRALIA PTY LTD (AU)

( * ) Notice: Subject to any disclaimer, the term of this patent is extended or adjusted under 35 U.S.C. 154(b) by 0 days.

(21) Appl. No.: 13/448,997

(22) Filed: Apr. 17, 2012

(65) Prior Publication Data

US 2012/0202581 A1 Aug. 9, 2012

Related U.S. Application Data

(63) Continuation of application No. 11/748,962, filed on May 15, 2007, now abandoned.

(30) Foreign Application Priority Data

May 15, 2006 (AU) ................................ 2006902576

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC .............. *G07F 17/32* (2013.01); *G07F 17/34* (2013.01)

(58) Field of Classification Search
CPC ....... G07F 17/34; G07F 17/32; G07F 17/3232
USPC ...................................................... 463/16–20
See application file for complete search history.

(56) References Cited

U.S. PATENT DOCUMENTS

| | | | | |
|---|---|---|---|---|
| 6,159,097 | A * | 12/2000 | Gura | 463/20 |
| 6,270,411 | B1 * | 8/2001 | Gura et al. | 463/20 |
| 6,315,660 | B1 * | 11/2001 | DeMar et al. | 463/16 |
| 6,349,301 | B1 | 2/2002 | Mitchell et al. | |
| 6,604,740 | B1 | 8/2003 | Singer et al. | |
| 2002/0142830 | A1 * | 10/2002 | Adams | 463/20 |
| 2002/0198041 | A1 | 12/2002 | Suganuma | |
| 2003/0087689 | A1 * | 5/2003 | Adams | 463/20 |
| 2003/0092487 | A1 * | 5/2003 | Meyer | G07F 17/3262 463/30 |

(Continued)

FOREIGN PATENT DOCUMENTS

| | | | |
|---|---|---|---|
| AU | 200301805 | B8 | 6/2003 |
| AU | 2002301805 | B2 | 6/2003 |

*Primary Examiner* — Omkar Deodhar
*Assistant Examiner* — Eric M Thomas
(74) *Attorney, Agent, or Firm* — McAndrews, Held & Malloy, Ltd.

(57) ABSTRACT

A gaming machine is disclosed that provides a game in which a player of the gaming machine stakes a wager on one or more outcomes of the game that are represented as symbols arranged in an array of symbol display positions. The player controls the number of outcomes on which a wager is staked by operating a user interface. During play of the game the gaming machine causes a display to display indicia representative of the total number of outcomes selected but not display indicia representative of every available outcome and not display indicia of every selected outcome. Indicia representative of an individual outcome is displayed when that outcome defines a winning combination. A method of providing a graphical user interface for a gaming machine is also disclosed.

20 Claims, 8 Drawing Sheets

(56) References Cited

U.S. PATENT DOCUMENTS

| | | | | |
|---|---|---|---|---|
| 2003/0216165 | A1* | 11/2003 | Singer | G07F 17/34<br>463/20 |
| 2004/0127280 | A1 | 7/2004 | Moody | |
| 2004/0192431 | A1* | 9/2004 | Singer | G07F 17/34<br>463/20 |
| 2004/0259627 | A1 | 12/2004 | Walker et al. | |
| 2005/0054429 | A1 | 3/2005 | Baerlocher et al. | |
| 2005/0143164 | A1 | 6/2005 | Duhamel et al. | |
| 2006/0014579 | A1* | 1/2006 | Kane | G07F 17/32<br>463/17 |
| 2006/0154723 | A1* | 7/2006 | Saffari | G07F 17/32<br>463/29 |
| 2007/0270208 | A1* | 11/2007 | Caspers | G07F 17/32<br>463/20 |

* cited by examiner

MULTIPLE PAY COMBINATION GAMING APPARATUS

RELATED APPLICATIONS

This application is a continuation of U.S. patent application Ser. No. 11/748,962 filed on May 15, 2007, which claims priority to an Australian patent application filed on May 15, 2006, as serial number AU2006902576, entitled "Multiple Pay Combination Gaming Apparatus," both of which are incorporated herein by reference in their entirety.

TECHNICAL FIELD

The present invention relates to gaming machines, gaming apparatus and to methods of gaming. In particular, the present invention relates to a multiple pay combination gaming apparatus and a method of providing a multiple pay combination gaming apparatus.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

Originally, gaming machines had physical spinning reels, which were controlled by a stepper motor. These gaming machines paid a prize if an outcome was spun up on a single central pay line that was a winning combination. Some later machines displayed three positions on each reel and provided three horizontal pay lines, one for each row that could be defined through the spinning reels.

It is now not uncommon for a player of an electronic gaming machine having a video display unit to be able to simultaneously play twenty-five or more pay lines in each activation of a game. It is usual and desirable to indicate to a player on screen the number of pay lines that can be purchased and how many pay lines have been purchased in a way that allows players to readily compare their purchase with what is available.

FIG. 14 shows an exemplary screen shot S8 of a game in which up to twenty-five lines can be played. The available twenty-five lines are indicated by pay line indicators 9. The player has selected to play ten lines and therefore the ten lines that are being played are highlighted. Typically, if a win occurred on one of the pay lines being played, the pay line which displays the winning outcome is highlighted, for example by flashing both the symbols in the outcome that meant that it was a winning combination and flashing the corresponding pay line indicator 9. Indication of the winning pay lines is required by the relevant gaming regulations in many jurisdictions.

There is a need or want in the industry for gaming machines to have a high number of pay lines, for example machines with 50, 100 or more pay lines. However, the higher the number of pay lines that are available, the more difficult it becomes to clearly display the pay lines on screen. In addition to providing information that allows a player to play the game in an informed way, a game designer or gaming machining manufacturer must overcome the problem of presenting the game in an attractive way.

SUMMARY OF THE INVENTION

According to a first aspect of the invention, there is provided a gaming machine comprising a display and a user interface in communication with a game controller, the gaming machine providing a game in which:

- a player of the gaming machine stakes a wager on one or more outcomes of the game, which are represented on the display as a plurality of symbols arranged in an array of symbol display positions;
- the player controls the number of outcomes on which a wager is staked by operating the user interface;
- the number of outcomes on which the player stakes a wager is displayed on at least one gauge that is displayed adjacent to the array of symbol display positions;
- if a winning combination of symbols occurs in at least one of the outcomes on which the player has staked a wager, the gaming machine awards an award associated with that winning combination and displays on the display an outcome indicator that indicates the outcome in which the winning combination of symbols occurred.

In one embodiment, an outcome indicator for a said outcome is only displayed during play of the game if a winning combination of symbols occurs in that outcome. In this embodiment, an outcome indicator may be displayed for an outcome in which a winning combination of symbols has occurred, whether or not the player has staked a wager on the outcome and wherein the outcome indicator is displayed differently depending on whether the player has staked a wager on that outcome.

In one embodiment, the outcome indicator for a said outcome is only displayed during play of the game if the player has staked a wager on that outcome and a winning combination of symbols occurs in that outcome.

In one embodiment, the player is constrained to select from a selection of groups of said outcomes on which to stake a wager, each group having a different number of outcomes in it and all including the outcomes of each group that has a lesser number of outcomes in it, and wherein during a play of the game the gauge displays indicia showing the number of outcomes in at least the group that has been selected for that game play. In this embodiment, the gauge may be displayed to the side of the array of symbol display positions and the gauge displays indicia representing the groups in order of size along the side of the array, and wherein the outcomes in a group are predominantly displayed so that the first symbol display position in the outcome is proximate the indicia on the gauge for that group.

In one embodiment, the outcomes are numbered and wherein the outcomes are predominantly displayed so that the first symbol display position in the outcome is located towards the top of the array for lower numbered outcomes and towards the bottom of the array for higher numbered outcomes.

In one embodiment, the outcomes are numbered and wherein the outcomes are predominantly displayed so that the first symbol display position in the outcome is located towards the bottom of the array for lower numbered outcomes and towards the top of the array for higher numbered outcomes.

In one embodiment, the user interface comprises a touch screen over the display and wherein the player touches operates the portion of the touch screen located over the gauge to place wagers on different numbers of outcomes.

In one embodiment, the gaming machine provides the game so that the player of the gaming machine can stake as part of the wager any of a plurality of different bets on the one or more outcomes, and wherein the bet that the player stakes is displayed on at least one further gauge that is also displayed on the display. In this embodiment, there may be one said gauge and one said further gauge that are displayed on opposite sides of the array of symbol display positions.

In one embodiment, the maximum number of outcomes on which a player can select to stake a wager by operating the user interface is at least 50.

In another embodiment, the maximum number of outcomes on which a player can select to stake a wager by operating the user interface is at least 100.

In one embodiment, the outcomes are pay lines defined across a plurality of spinning reels.

According to a second aspect of the invention, there is provided a gaming machine comprising a display and a user interface in communication with a game controller, the gaming machine providing a game in which a player of the gaming machine stakes a wager on one or more outcomes of the game, which are represented on the display as a plurality of symbols arranged in an array of symbol display positions, and the player controls the number of outcomes on which a wager is staked by operating the user interface, and if a winning combination of symbols occurs in at least one of the outcomes the gaming machine awards an award, wherein during play of the game the game controller causes the display to display indicia representative of the total number of outcomes selected but not display indicia individually indicating every available outcome and not display indicia individually indicating every selected outcome.

In one embodiment, the indicia representative of the total number of outcomes selected comprises an integer displayed on the display, the integer indicating the number of outcomes selected.

In one embodiment, the game controller causes the display to display indicia representative of a plurality of options of groups of outcomes available to be selected using the user interface. In this embodiment, the game controller may also cause the display to highlight or display indicia that indicates the total number of outcomes that are selected using the user interface. Also, the user interface may have a corresponding number of buttons to the plurality of options and the buttons are marked with corresponding indicia to the indicia displayed on the display.

In one embodiment, the indicia comprises a graduated scale and the game controller causes the display to highlight a position on the scale depending on the number of outcomes selected using the user interface in comparison to the total number of outcomes available to be selected.

In one embodiment, if one or more of the outcomes selected using the interface is a winning combination, the game controller further causes the display to display indicia representative of the winning outcome or outcomes.

In one embodiment, if a plurality of winning outcomes occurs during play of the game, each winning outcome is displayed sequentially.

According to a third aspect of the invention, there is provided a gaming machine comprising a display and a user interface in communication with a game controller, the gaming machine providing a game in which a player of the gaming machine stakes a wager on one or more outcomes of the game, which are represented on the display as a plurality of symbols arranged in an array of symbol display positions, and the player controls the number of outcomes on which a wager is staked by operating the user interface, and if a winning combination of symbols occurs in at least one of the outcomes the gaming machine awards an award, wherein the game controller causes the display to only display indicia of an individual outcome in the array during play of the game when that outcome defines a winning combination.

In one embodiment, the game controller causes the display to display the total number of outcomes selected using the user interface. In this embodiment, the game controller may also cause the display to display a number showing the total number of outcomes that are available to be selected.

In one embodiment, the game controller also causes the display to display a graphic representation of the proportion of the number of outcomes selected using the user interface in comparison to the maximum number of outcomes that can be selected.

According to a fourth aspect of the invention, there is provided a method of providing a graphical user interface on a display of a gaming machine which provides a game in which a player has control over the number of outcomes purchased in the game, the method comprising displaying on the display a plurality of playing elements from which the outcomes are defined and only displaying indicia showing a particular outcome within the playing elements when that particular outcome defines a winning combination.

In one embodiment, the method further comprises displaying indicia representative of the number of outcomes purchased.

In one embodiment, the method further comprises displaying the total number of outcomes available to be purchased.

In one embodiment, the method further comprises displaying a representation of the proportion of outcomes purchased relative to the total number of outcomes available to be purchased.

According to a fifth aspect of the invention, there is provided a gaming machine comprising:

credit input means to receive credit for wagering on game plays of a game playable on the gaming machine;

display means comprising one or more displays;

one or more input devices that allow the player to specify a wager to stake on a variable number of the outcomes before the outcomes are displayed on the display means;

a game controller that receives inputs from the one or more input devices, determines from the inputs the number of outcomes on which a wager has been staked, reduces a balance of credit that has been received by the credit input means, and randomly selects outcomes for the game, wherein the game controller further controls the display means to display representations of the game and display an indicator of the determined number of outcomes on which a wager has been staked as a gauge and display an outcome indicator that indicates any outcomes that are associated with the wager that has been staked and the number of outcomes represented by the gauge that result in a winning combination; and prize payment means controlled by the game controller to pay a prize for any said winning combination that occurs in at least one of the outcomes on which the player has staked a wager and which are represented by the gauge.

Further aspects of the present invention and further embodiments of the aspects of the invention described in the preceding paragraphs will become apparent from the following description, given by way of example and with reference to the accompanying drawings.

BRIEF DESCRIPTION OF THE DRAWINGS

Notwithstanding any other embodiments that may fall within the scope of the present invention, certain embodiments of the present invention will now be described, by way of example only, with reference to the accompanying figures, in which.

DETAILED DESCRIPTION

Figure 1:
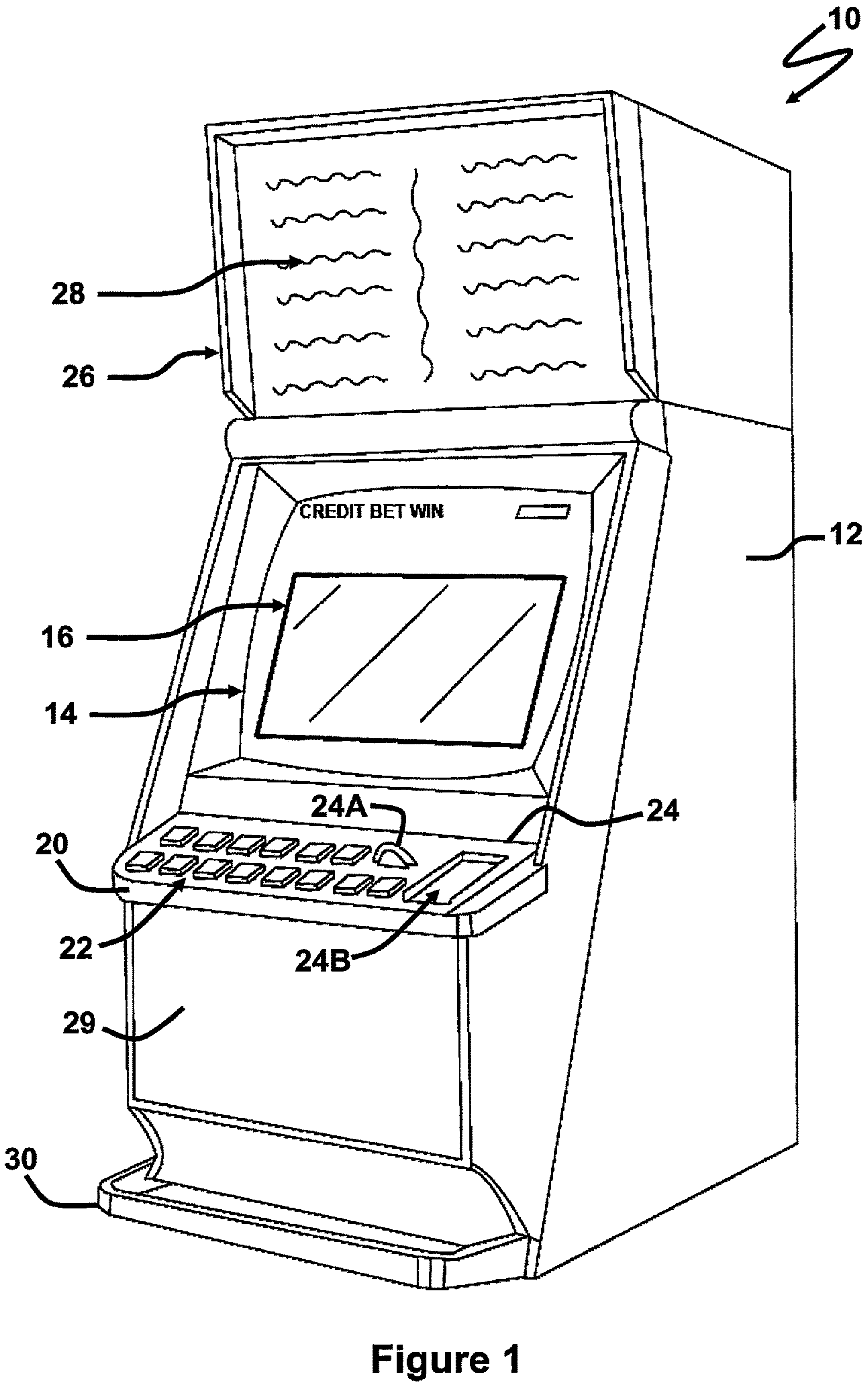
FIG. 1: shows diagrammatically, a view of a gaming machine suitable for implementing an embodiment of the present invention.

In FIG. 1 of the accompanying drawings, one example of a gaming machine suitable for implementing an embodiment of the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or a different type of display.

Figure 2:
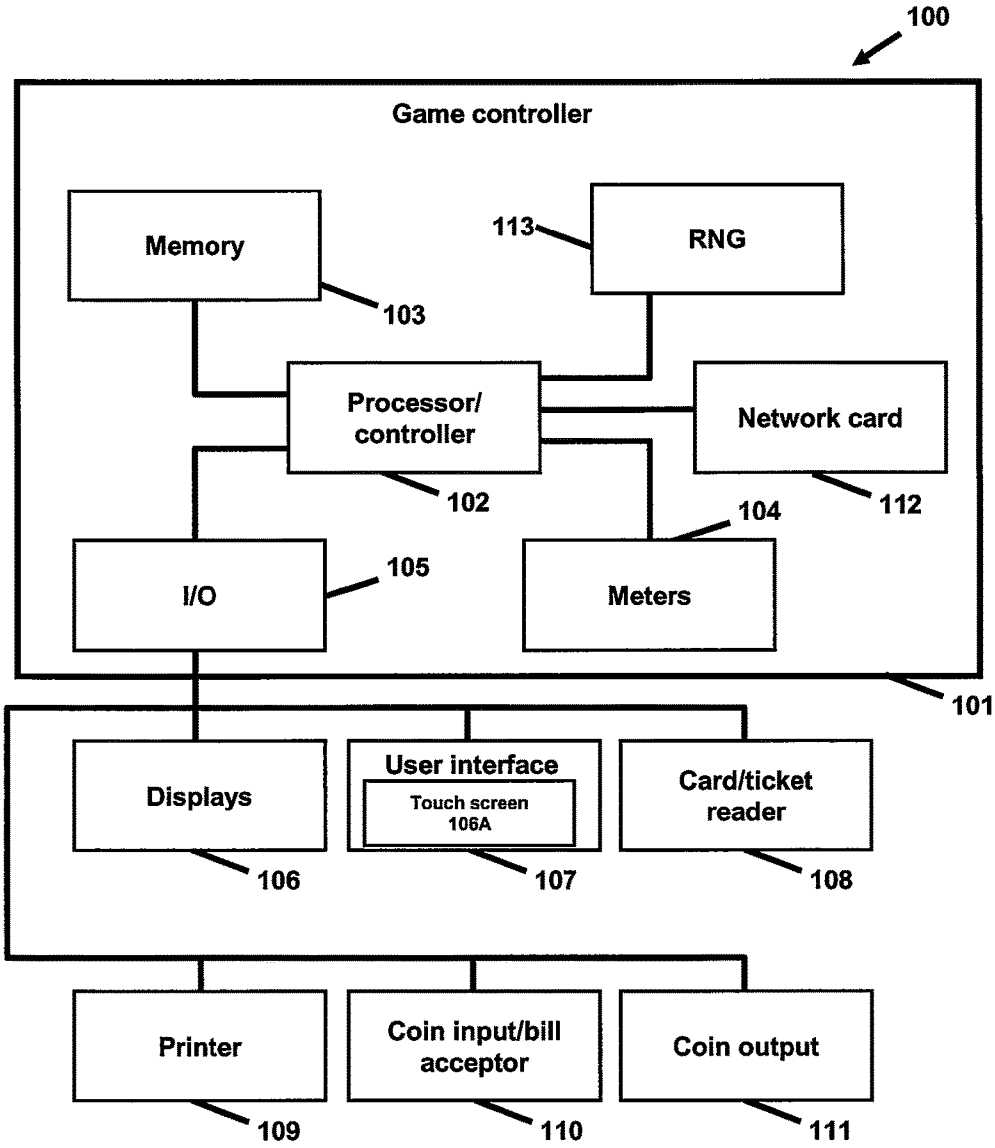
FIG. 2: shows a block diagram of gaming apparatus suitable for implementing an embodiment of the present invention.

FIG. 2 shows a block diagram of a gaming apparatus, generally referenced by arrow 100, suitable for implementing an embodiment of the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102. Typically, the gaming apparatus 100 will include both volatile and non-volatile memory and more than one of each type of memory, with such memories being collectively represented by the memory 103. The instructions to cause the game controller 101 to implement an embodiment of the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, a user interface 107 including a touch screen 106A, a card and/or ticket reader 108, a printer 109, a bill acceptor and/or coin input mechanism 110 and a coin output mechanism 111. Additional devices may be included as part of the gaming apparatus 100, or devices omitted as required for the specific implementation.

In addition, the gaming apparatus 100 may include a communications interface, for example a network card 112. The network card, may for example, send status information, accounting information or other information to a central controller, server or database and receive data or commands from a the central controller, server or database. As explained in more detail in relation to FIG. 4, the computational device 102 may include two or more controllers or processors, which may be local or remote from each other and the displays 106.

Figure 3:
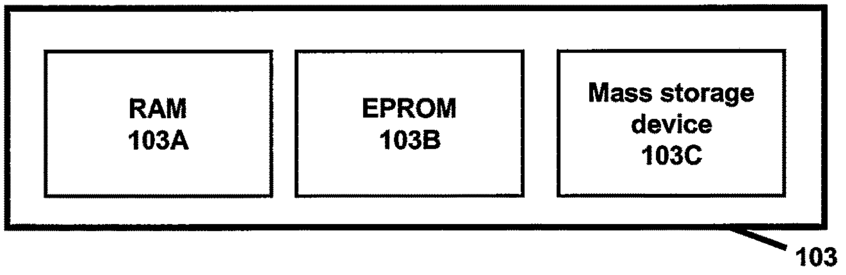
FIG. 3: shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Figure 4:
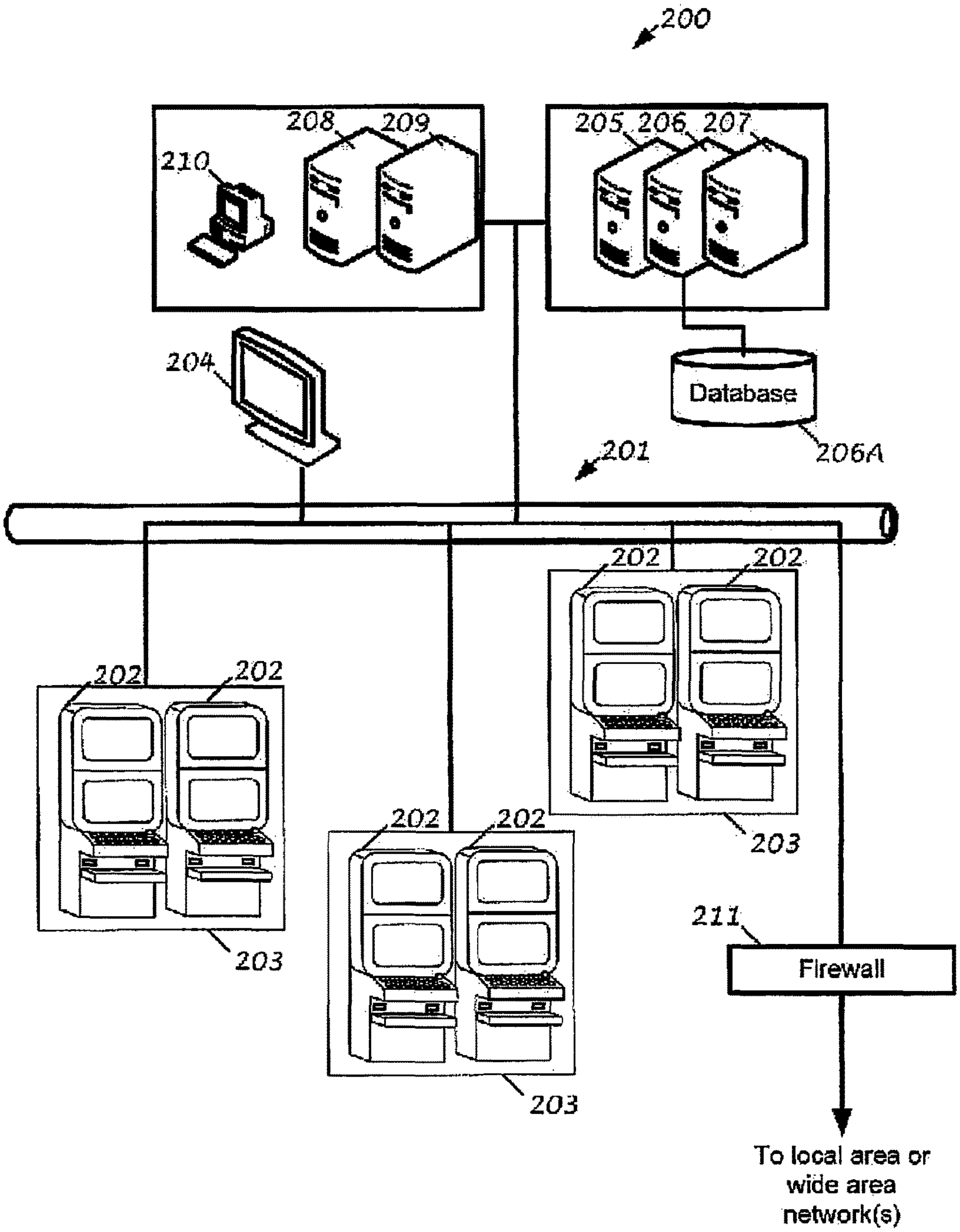
FIG. 4: shows diagrammatically, a network gaming system suitable for implementing an embodiment of the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 with associated database 206A may store game programs and associated data for downloading or access by the gaming devices 202 and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

FIGS. 5 to 10 show exemplary screen shots S1 to S6 of a game 16 in accordance with one embodiment of the present invention. The game may be implemented by the gaming machine 10, gaming apparatus 100 and/or within the gaming system 200, with a game controller 101 causing a display 106 to display the screen shots S1 to S6 during game play. Unless specifically stating otherwise, the following description refers to implementation of the game on a standalone gaming machine 10 (see FIG. 1).

The game 16 is a spinning reel type game. Five spinning reels 1-5 are provided, each of which displays four playing elements or symbols 6 (one only indicated by a reference numeral). The symbols therefore define a matrix of five columns and four rows. If the game 16 pays from left to right, as is typical of a spinning reel game, up to 1024 different outcomes can be defined in the matrix, representing every possible combination of visible symbols, with each combination having one symbol from each of the five reels 1 to 5.

Figure 5:
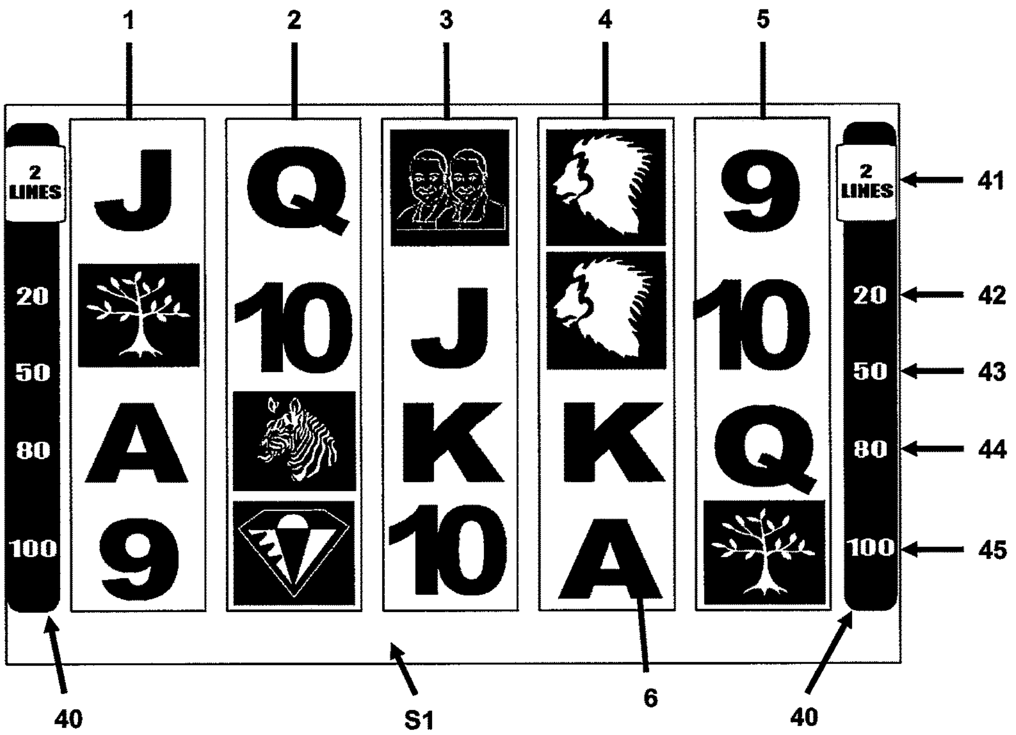
FIGS. 5 to 10: show exemplary screen shots from a gaming apparatus implementing a first game of certain embodiments of the present invention.
Figure 6:
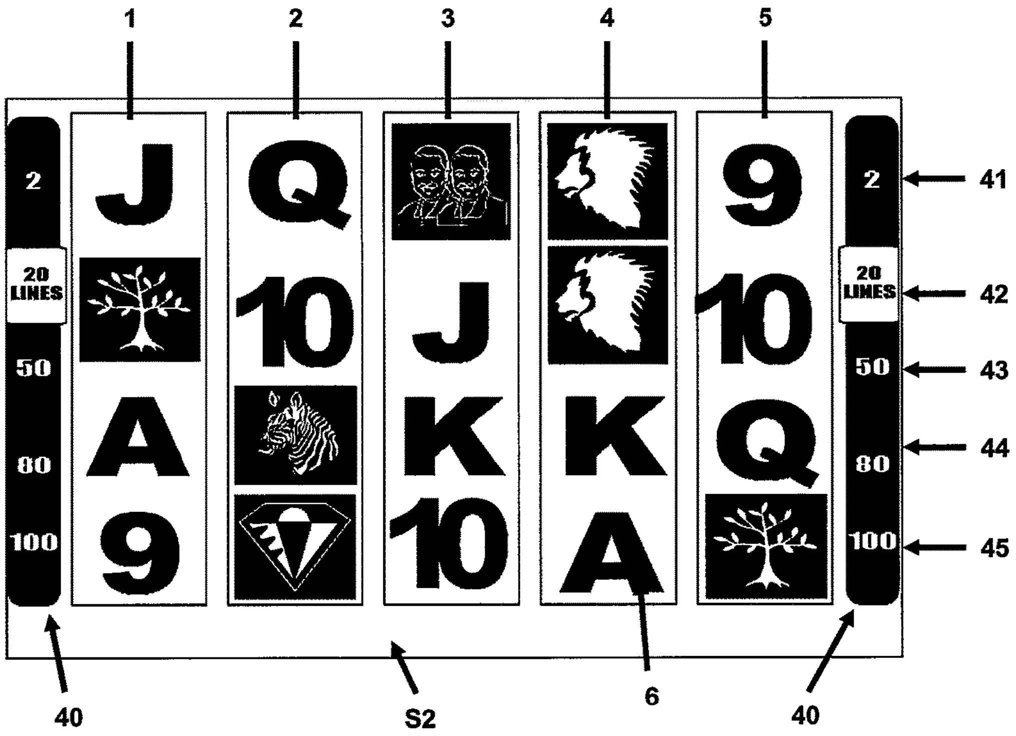
Figure 7:
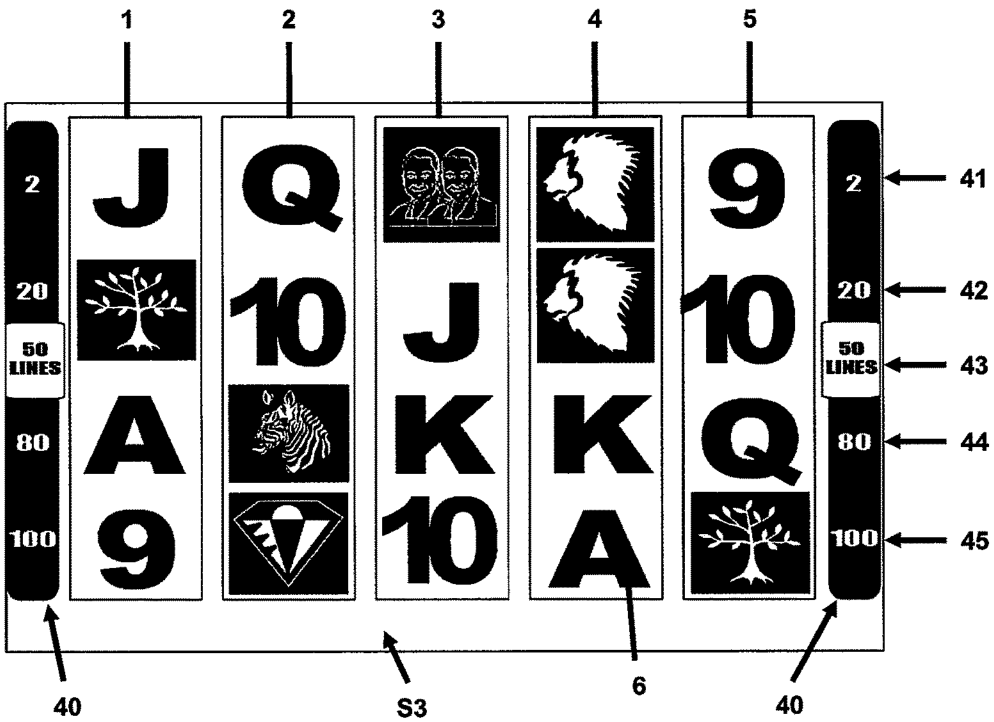
Figure 8:
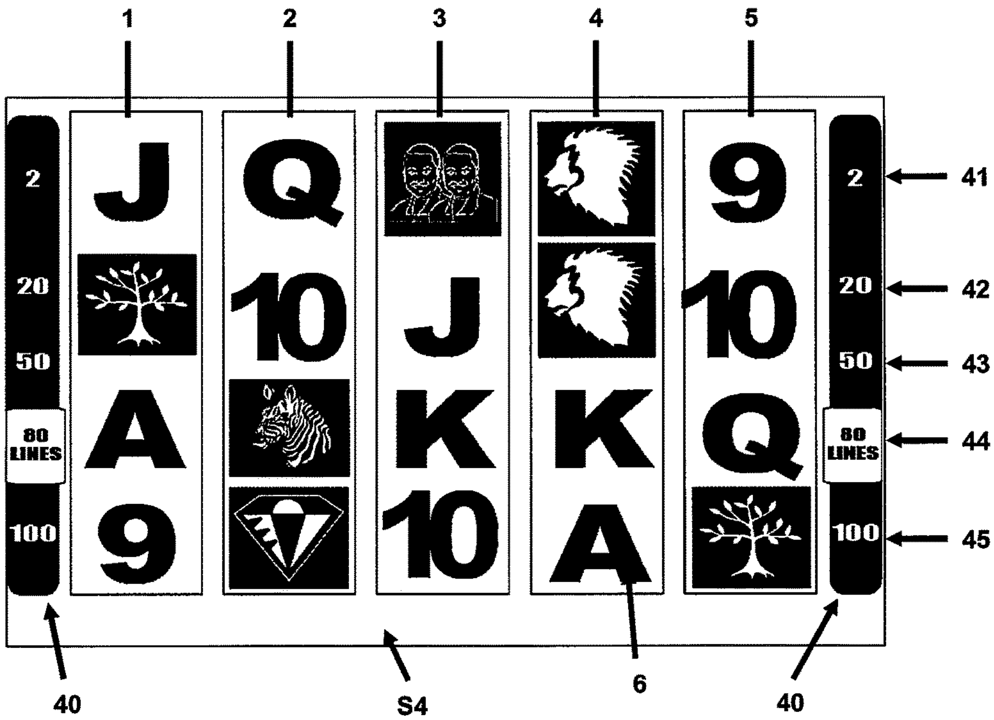
Figure 9:
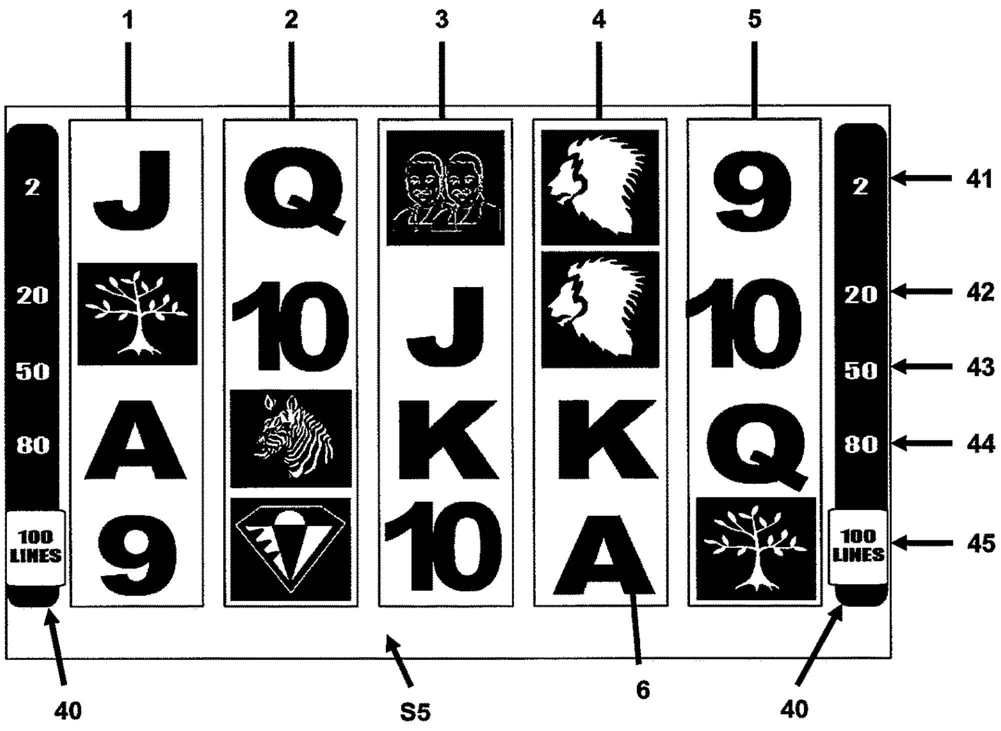

In the exemplary game 16 shown in FIGS. 5 to 10, a wager indicator 40 shows five combinations, indicated by combination indicators 41-45. Each combination indicator 41-45 shows the number of outcomes or pay lines that are included in that combination. In the example shown, the available combinations allow two, twenty, fifty, eighty or one hundred lines to be purchased by a player. FIG. 5 shows a screen shot S1 when two lines have been purchased, FIG. 6 shows a screen shot S2 when twenty lines have been purchased and so forth for FIGS. 7 to 9. As is usual in a gaming machine, during normal play and excluding from consideration any "scatter pays" or other special symbols or features that may be provided, only a winning combination that occurs on a purchased pay line results in the award of a prize in credits or another award.

FIGS. 5 to 10 show an embodiment of the present invention in which all five combination indicators 41-45 are displayed on screen and the selected combination is highlighted. In less preferred embodiments, the display may only show the combination indicator 41-45 that corresponds to the combination selected by the player. For example, in FIG. 5 only the combination 41 showing "2" lines may be displayed and in FIG. 8 only the combination 44 showing "80" lines may be displayed.

The wager indicator 40 can be viewed as a representation of a gauge, which gives a graphical representation of the proportion of outcomes purchased relative to the total number of outcomes available to be purchased. The gauge starts at the top of the screen (FIG. 5) when the minimum number of outcomes has been purchased and progresses towards the bottom of the screen (FIG. 9) when all possible outcomes have been purchased. Although the gauge shown in FIGS. 5 to 10 shows discrete tabs for each combination indicator 41-45, this is not essential and the gauge may appear more like a temperature gauge, optionally changing colour dependent on the number of outcomes purchased and optionally only displaying an integer that indicates the number of outcomes purchased.

Therefore, in accordance with the instructions of the game 16, the game controller 101 causes the display 14 to show indicia of the number of outcomes purchased without the complexity and clutter of displaying every outcome that is available to be purchased. In addition, the screen preferably also graphically displays a representation of the proportion of outcomes purchased relative to the total number available to be purchased. This can be a general indication of proportion rather than an exact or close approximation of the actual proportion, as is the case with the example provided in FIGS. 5 to 10.

The bank of buttons 22 or other user interface 107, which may include the touch screen 106A, preferably has a button or other selector corresponding to each of the five combinations. Alternatively, a single button may be used to cycle through the five available options, or two buttons provided, one to move to the next highest option and the other to move to the next lowest option. In one embodiment, a player of the gaming machine 10 could touch the touch screen and drag his or her finger along the combination indicator 40 or other gauge, with the number of pay lines increasing or decreasing as the player moves along the combination indicator. The gaming machine 10 would display an increasing or decreasing wager amount in a bet indicator 48 (see FIG. 10) as the number of pay lines selected for purchase increase or decrease respectively.

In an alternative game, the player may be able to select many more combinations of outcomes. For example, for a game having five spinning reels and three symbols from each reels displayed for each game activation the player may be able to choose between 1 and 1024 lines. In this case, the bank of buttons 22 or other user interface 107 may have an "increase bet" button and a "decrease bet" button. The wager indicator 40 when displayed as a gauge may then also have a much higher resolution of steps and could show a moving marker as the player pressed the "increase bet" and "decrease bet" buttons.

Figure 10:
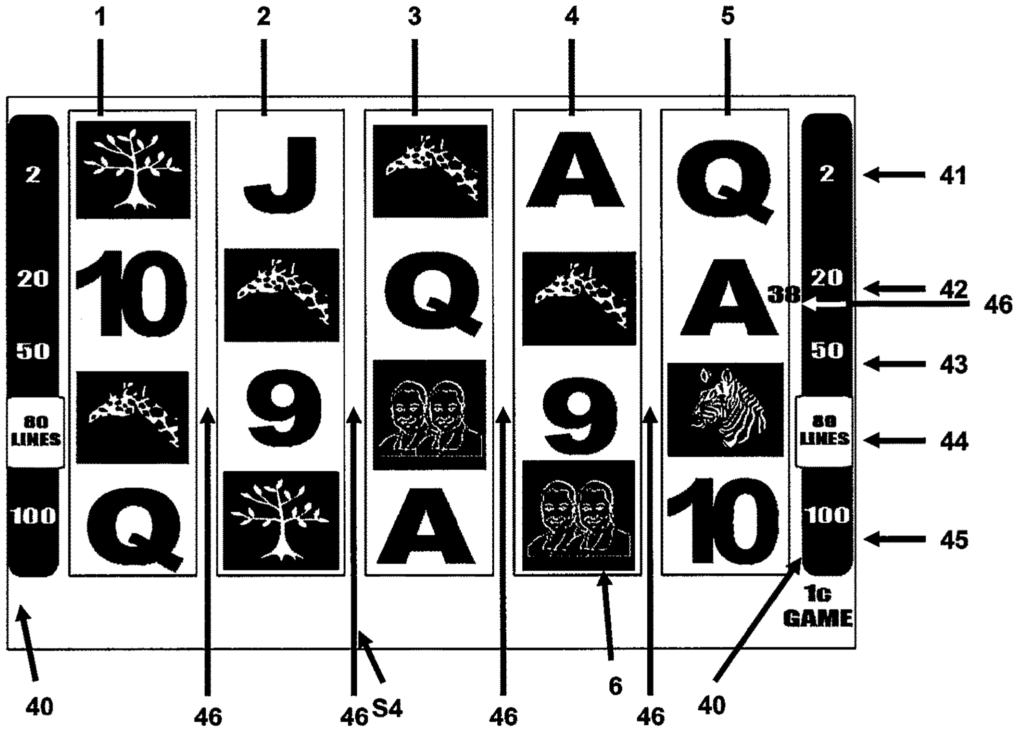

FIG. 10 shows a screen shot S6 following the purchase of eighty pay lines and play of the game 16. The result of the game is that one of the purchased outcomes, the thirty-eighth pay line is a winning combination. Having purchased eighty lines, as indicated by the highlighting of combination 44 in the wager indicator 40, at a cost of 40 credits ($0.40 in a 1 cent game) as indicated on the screen under the "BET" heading, a win of 8 credits resulted, as indicated on the screen under the "WIN" heading. The win of 8 credits would typically be stored by the game controller 101 in a software implemented win meter, and then transferred to the credit meter of the gaming apparatus after any subsequent events that may be provided as part of the game.

An outcome indicator 46 indicates the pay line that caused the win. No outcome indicator 46 is displayed for any pay line that did not contain a winning combination. Multiple outcome indicators 46 may be displayed sequentially or simultaneously if more than one pay line contained a winning combination that contributed to the win meter under the game rules. In the embodiment shown, the outcome indicator 46 includes a number identifying the pay line and also a representation of a pay line 46A showing the symbols that made up the pay line. These symbols may also flash or otherwise be highlighted to the player.

The arrangement of the outcomes, in this example pay lines may be varied to match the wager indicator 40. Traditionally, the pay line allocated to pay line number one is a straight pay line that traverses through the centre row of the symbols defined by the displayed part of the spinning reels. In the currently contemplated preferred embodiment the pay line allocated to pay line number one is located towards the top of the screen to match the location of the combination indicator 41. The first 50 pay lines may be predominantly defined by symbols in the upper two rows and the second 50 pay lines may be predominantly defined by symbols in the lower two rows. In one embodiment, the first symbol or leftmost symbol in a game that pays left to right across the spinning reels, is dominant, so that the first 50 pay lines are defined by patterns where the symbol on the first reel is predominantly on the upper two rows. Similarly, for the second 50 pay lines the symbol used on the first reel may be predominantly located on the lower two rows.

Figure 11:
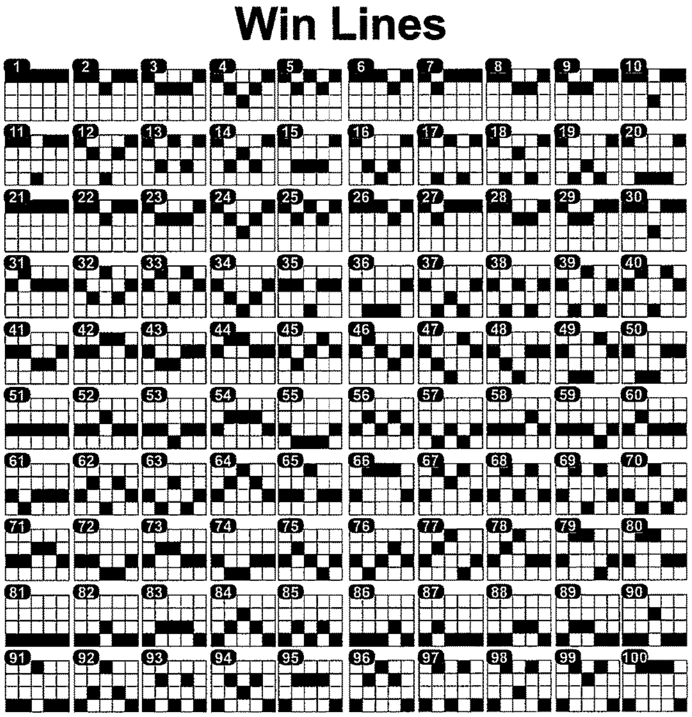
FIG. 11: shows an arrangement of pay line outcomes for the game shown in FIGS. 5 to 10.

FIG. 11 shows a possible arrangement of lines in accordance with this arrangement method. In this arrangement the first 50 pay lines, specifically pay line 1 to pay line 50 all have the first symbol position in one of the top two rows of the first column/reel. These lines also have the last symbol position in the same row of the last column/reel. Similarly, the last 50 pay lines have first and last symbol positions in the lower two rows of the first and last columns/reels respectively.

Figure 12:
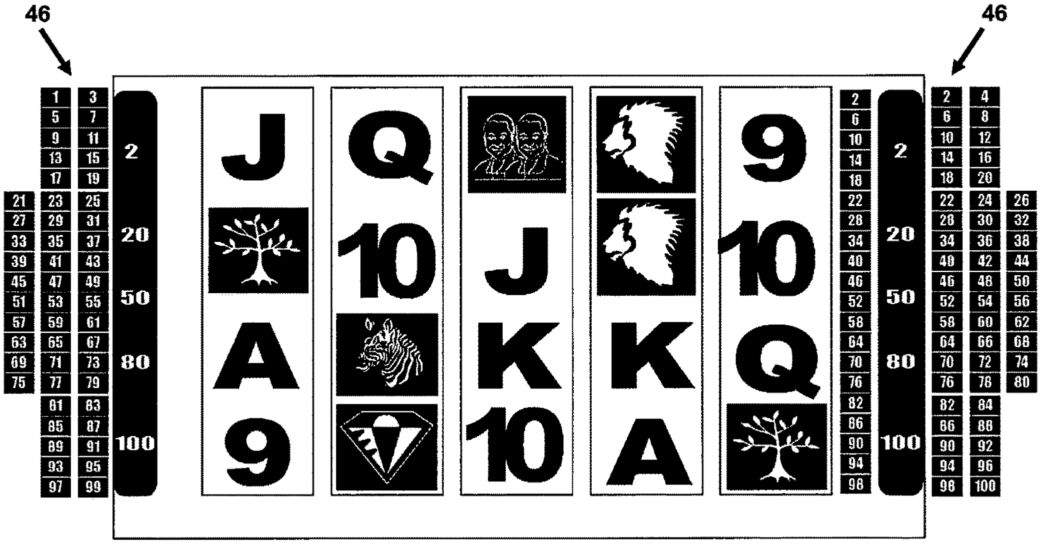
FIG. 12: shows numbered outcome indicators for the 100 pay lines shown in FIG. 11.

FIG. 12 shows all 100 of the outcome indicators 46 for the game described herein in relation to FIGS. 5 to 11. When an outcome displays a winning combination of symbols, the outcome indicator 46 for that outcome is displayed between the wager indicator 40 and the symbols in the position horizontally in line to the position of the outcome indicator 46 shown in FIG. 12. For example, the outcome indicator '3' would be displayed between the wager indicator 40 and the symbols where the outcome indicator '1' is currently shown. Similarly, the outcome indicator '42' would be displayed where the outcome indicator '40' is currently shown.

In the example game shown in FIG. 10, the player wagered one credit per line-cost. The game may provide the option to wager two or more credits per line cost. For example, if the player played eighty lines at two credits per line cost and game outcomes of FIG. 10 resulted, the bet would have been eighty credits and the win sixteen credits. The player could vary the credits per line cost using the bank of buttons 22.

Figure 13:
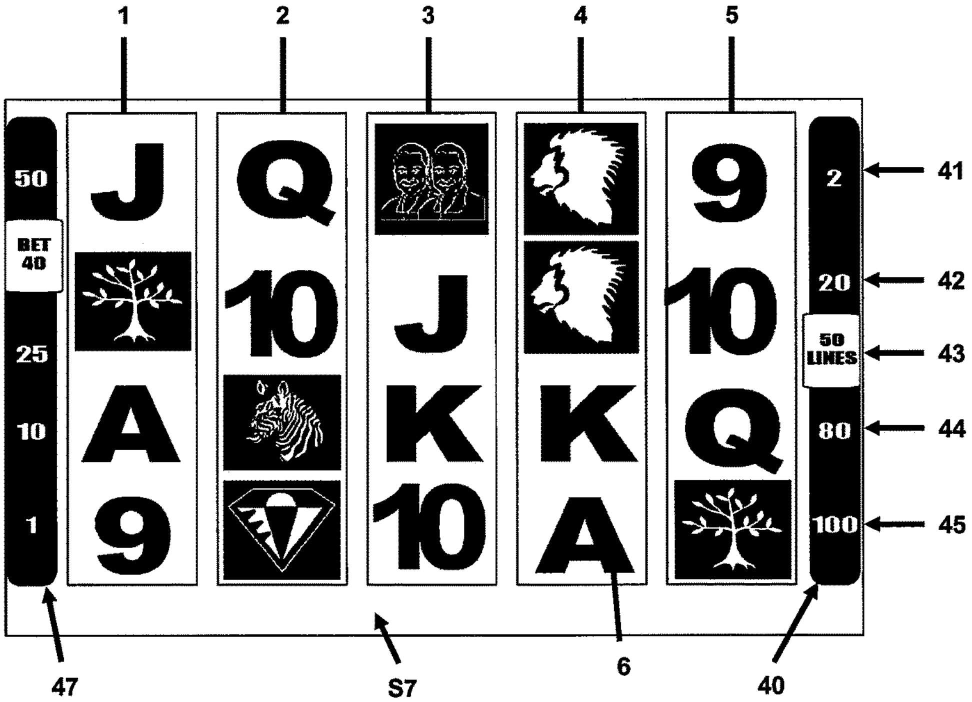
FIG. 13: shows an exemplary screen shot from a gaming apparatus implementing a second game of an embodiment of the present invention.
Figure 14:
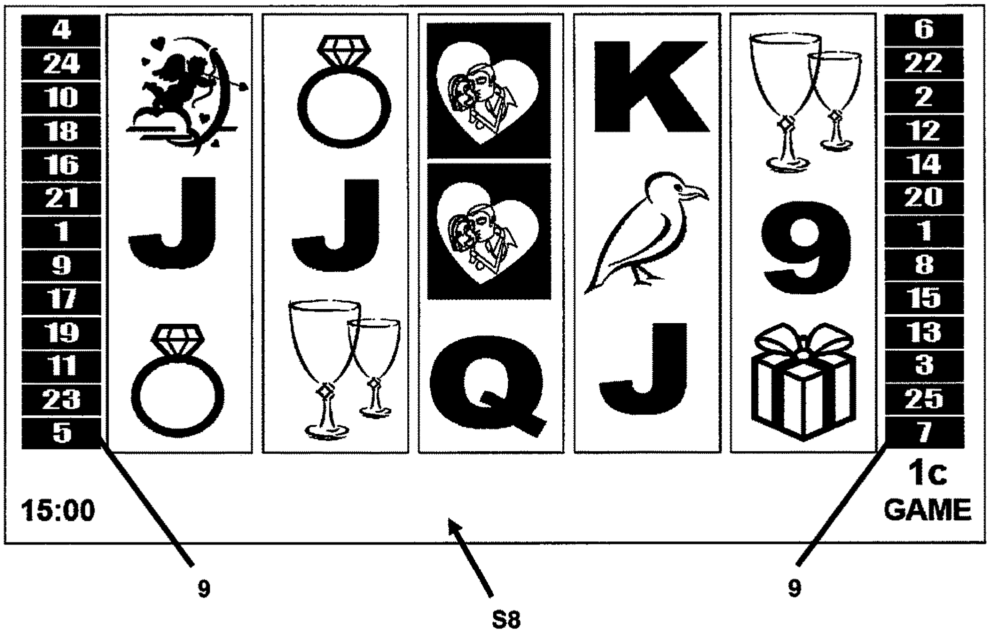
Figure 14 (Prior art)
FIG. 14: shows a screen shot showing the pay line structure of some prior art games.

FIG. 13 shows an example screen shot S7 in which the credits per line-cost are also displayed as a gauge. In screen shot S7 the wager indicator 40A is similar to that previously described and a per line-cost indicator 47 shows the bets per line, the options being 1, 10, 24, 40 (currently selected) and 50 in the example shown.

In one embodiment of the invention, where a player has purchased less than the maximum number of outcomes and one or more winning combinations occurred in outcomes that were not purchased, then the gaming apparatus may indicate this to the player. For example, if the player purchased 20 lines in a game supporting up to 100 lines, winning combinations in lines 21 to 100 may be indicated. Preferably the indication is in a less prominent way than for winning combinations that occur in outcomes that have been purchased.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming machine to allow a player of the gaming machine to stake a wager on an outcome of a game of chance, comprising:

a credit input mechanism configured to enable player interaction to receive a physical item representing a monetary value for providing a credit input for establishing a credit balance;

hardware meters configured to monitor the credit input having been provided by the credit input mechanism;

a display; and an electronic game controller configured to control the display, in accord with said hardware meters having monitored the credit input having been provided by the credit input mechanism receiving the physical item, to display a game image on said display, the game image comprising:

a game outcome area configured to present the outcome of the game of chance; and a pay line indicator area located adjacent the game outcome area, the pay line indicator area comprising:

(1) an end region;

(2) a plurality of first integers being displayed at spaced apart intervals in the end region, each of said plurality of first integers representing a predefined quantity of pay lines that are selectable to evaluate the outcome, one of said plurality of first integers defining a maximum quantity of available pay lines for selection, and one of said plurality of first integers identifying a quantity of the pay lines that have been selected to evaluate the outcome; and (3) a second integer identifying a winning pay line in one of said predefined quantity of pay lines that are unselected, wherein the electronic game controller is further configured to control the display to visually emphasize the one of said plurality of first integers identifying a quantity of the pay lines that have been selected in comparison to the other of said plurality of first integers identifying quantities of unselected pay lines.

2. The gaming machine as claimed in claim 1, wherein the game image comprises a third integer that is only visible if the symbols in the game outcome area correspond to a predefined winning outcome, the third integer representing a line number of one of the pay lines selected by the player that is associated with the predefined winning outcome.

3. The gaming machine as claimed in claim 2, wherein the third integer is one of a plurality of third integers each of which represents a different line number of one of the pay lines selected by the player that is associated with the predefined winning outcome, the third integers being sequentially depicted in the game image such that only one of the third integers is viewable at any time.

4. The gaming machine as claimed in claim 2, wherein the third integer is disposed between the game outcome area and the pay line indicator area.

5. The gaming machine as claimed in claim 1, wherein the quantity of pay lines selected is one of a plurality of predefined pay line options available for selection by the player, each of the predefined pay line options representing a unique quantity of the pay lines available for selection by the player.

6. A gaming machine to allow a player of the gaming machine to stake a wager on an outcome of a game of chance, the gaming machine comprising:

a display;

a credit input mechanism configured for player interaction to receive a physical item representing a monetary value for providing a credit input for establishing a credit balance;

hardware meters configured to monitor the credit input having been provided by the credit input mechanism; and an electronic game controller configured to display, in accord with said hardware meters having monitored the credit input having been provided by the credit input mechanism receiving the physical item, a game image on the display, the game image comprising:

(1) an end region;

(2) a plurality of first integers being displayed at spaced apart intervals in the end region, each of said plurality of first integers representing a predefined quantity of the pay lines that are selectable to evaluate the outcome, one of said plurality of first integers defining a maximum quantity of available pay lines for selection, and one of said plurality of first integers identifying a quantity of the pay lines that have been selected to evaluate the outcome; and (3) a second integer identifying a winning pay line in one of said predefined quantity of pay lines that are unselected, and wherein the first integer representing a selected quantity of pay lines is visually emphasized in comparison to the first integers identifying quantities of the unselected pay lines.

7. The gaming machine as claimed in claim 6, wherein the game image comprises a third integer that is only visible if the symbols in the game outcome area correspond to a predefined winning outcome, the third integer representing a line number of one of the pay lines selected by the player that is associated with the predefined winning outcome.

8. The gaming machine as claimed in claim 7, wherein the third integer is one of a plurality of third integers each of which represents a different line number of one of the pay lines selected by the player that is associated with the predefined winning outcome, the third integers being sequentially depicted in the game image such that only one of the third integers is viewable at any time.

9. The gaming machine as claimed in claim 7, wherein the third integer is disposed between the game outcome area and the pay line indicator area.

10. The gaming machine as claimed in claim 6, wherein the number of pay lines selected is one of a plurality of predefined pay line options available for selection by the player, each of the predefined pay line options representing a unique number of the pay lines available for selection by the player.

11. A gaming machine to allow a player of the gaming machine to stake a wager on an outcome of a game of chance, the gaming machine comprising:

a credit input mechanism configured for player interaction to receive a physical item representing a monetary value for providing a credit input for establishing a credit balance;

hardware meters configured to monitor the credit input having been provided by the credit input mechanism;

a display; and an electronic game controller configured to display via the display and, in accord with said hardware meters having monitored the credit input having been provided by the credit input mechanism receiving the physical item:

(i) an end region;

(ii) a plurality of first integers being displayed at spaced apart intervals in the end region, each of said plurality of first integers representing a predefined quantity of pay lines that are selectable to evaluate the outcome, one of said plurality of first integers defining a maximum quantity of available pay lines for selection, and one of said plurality of first integers identifying a quantity of the pay lines that have been selected to evaluate the outcome; and (iii) a second integer identifying a winning pay line in one of said predefined quantity of pay lines that are unselected, and wherein the first integer representing a selected quantity of pay lines is visually emphasized in comparison to the first integers identifying quantities of unselected pay lines.

12. The gaming machine as claimed in claim 11, wherein the game controller controls the display such that the game image comprises a third integer that is only visible if the symbols in the game outcome area correspond to a predefined winning outcome, the third integer representing a line number of only one of the pay lines selected by the player that is associated with the predefined winning outcome.

13. The gaming machine as claimed in claim 12, wherein the third integer is one of a plurality of third integers each of which represents a different line number of one of the pay lines selected by the player that is associated with the predefined winning outcome, the game controller controlling display of the game image such that the third integers are sequentially depicted in the game image such that only one of the third integers is viewable at any time.

14. The gaming machine as claimed in claim 12, wherein the third integer is disposed between the game outcome area and the pay line indicator area.

15. The gaming machine as claimed in claim 11, wherein the number of pay lines selected is one of a plurality of predefined pay line options available for selection by the player, each of the predefined pay line options representing a unique number of the pay lines available for selection by the player.

16. A gaming machine to allow a player of the gaming machine to stake a wager on an outcome of a game of chance, the gaming machine comprising:

a display;

a credit input mechanism configured for player interaction to receive a physical item representing a monetary value for providing a credit input for establishing a credit balance;

hardware meters configured to monitor the credit input having been provided by the credit input mechanism; and an electronic game controller configured to control the display, in accord with said hardware meters having monitored the credit input having been provided by the credit input mechanism, to display a game outcome area configured to present the outcome of the game of chance and comprising:

(i) an end region;

(ii) a plurality of first integers being displayed at spaced apart intervals about the end region, each of said plurality of first integers representing a predefined quantity of pay lines that are being selectable to evaluate the outcome, one of said plurality of first integers defining a maximum quantity of available pay lines for selection, and one of said plurality of first integers identifying a quantity of the pay lines that have been selected to evaluate the outcome; and (iii) a second integer identifying a winning pay line in one of said predefined quantity of pay lines that are unselected, wherein the first integer representing a selected quantity of pay lines is visually emphasised in comparison to the first integers identifying quantities of unselected pay lines.

17. The gaming machine as claimed in claim 16, wherein the game image comprises a third integer that is only visible if the symbols in the game outcome area correspond to a predefined winning outcome, the third integer representing a line number of one of the pay lines selected by the player that is associated with the predefined winning outcome.

18. The gaming machine as claimed in claim 17, wherein the third integer is one of a plurality of third integers each of which represents a different line number of one of the pay lines selected by the player that is associated with the predefined winning outcome, the third integers being sequentially depicted in the game image such that only one of the third integers is viewable at any time.

19. The gaming machine as claimed in claim 17, wherein the third integer is disposed between the game outcome area and the pay line indicator area.

20. The gaming machine as claimed in claim 16, wherein the number of pay lines selected is one of a plurality of predefined pay line options available for selection by the player, each of the predefined pay line options representing a unique number of the pay lines available for selection by the player.

* * * * *